United States Patent [19]

Rogers

[11] 4,203,683
[45] May 20, 1980

[54] BALL JOINTS

[75] Inventor: Peter R. Rogers, Neath, Wales

[73] Assignee: Cam Gears Limited, Hertfordshire, England

[21] Appl. No.: 894,491

[22] Filed: Apr. 7, 1978

[30] Foreign Application Priority Data

Apr. 12, 1977 [GB] United Kingdom ............... 15041/77

[51] Int. Cl.² .......................... F16C 11/00; F16D 1/12
[52] U.S. Cl. ....................................... 403/132; 403/135
[58] Field of Search ............... 403/132, 133, 138, 135, 403/137

[56] References Cited

U.S. PATENT DOCUMENTS

| 2,453,742 | 11/1948 | Bowen et al. | 403/132 X |
| 2,736,580 | 2/1956 | Boetcker | 403/132 |
| 3,102,744 | 9/1963 | Reuter et al. | 403/138 |
| 3,950,006 | 4/1976 | Wood | 403/133 X |
| 3,967,907 | 7/1976 | Schmidt | 403/133 |

FOREIGN PATENT DOCUMENTS

| 233067 | 2/1961 | Australia | 403/135 |
| 461065 | 3/1929 | Fed. Rep. of Germany | 403/137 |
| 2042961 | 4/1971 | Fed. Rep. of Germany | 403/132 |

Primary Examiner—Wayne L. Shedd

[57] ABSTRACT

A ball joint comprises a housing having a bore. A ball is received in the bore. Means is provided to restrain the ball against withdrawal from the bore and another means restrains the ball against excessive penetration into the bore. The housing material is recessed at the region of the bore on which the ball bears in its restrained position. The recess receives a bearing annulus of synthetic plastics material having low friction and good wearing characteristics.

11 Claims, 1 Drawing Figure

U.S. Patent  May 20, 1980  4,203,683
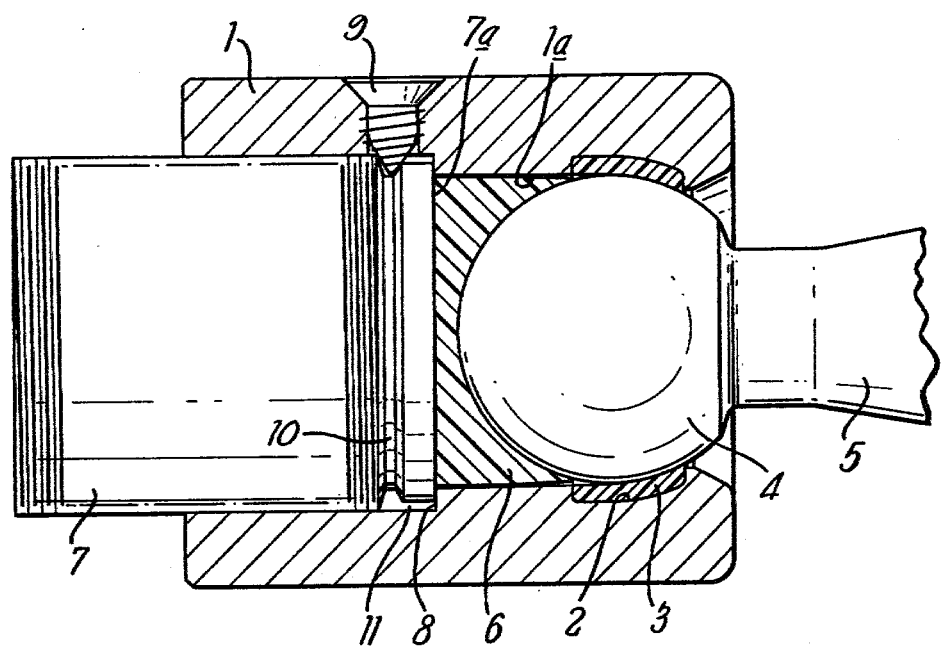

BALL JOINTS

This invention relates to ball joints, and is particularly concerned with ball joints including bearing material between the ball and the ball housing.

It is known, for example in U.K. Patent Specification No. 930,555, to provide bearing material having low friction and good wearing properties between the ball and the ball housing in a ball joint. In view of the thickness of the bearing material it is necessary to use a ball appreciably smaller than the diameter of the bore in the housing. This has the disadvantage that for the same transmitted loading, a smaller ball will be stressed to a greater degree than one that occupies the full diameter of the bore.

According to the present invention there is provided a ball joint comprising a housing formed with a bore, a ball received in the bore, means capable of restraining the ball against withdrawal from the bore and means capable, in use, of restraining the ball against excessive penetration into the bore, and characterised in that the housing material is recessed at the region of the bore on which the ball bears in its restrained position, to receive a bearing annulus of synthetic plastics material having low friction and good wearing characteristics, the housing being integrally formed, at least around the recess.

By the present invention the ball of the ball joint may be made substantially the same diameter as the bore. The bearing annulus may extend into the bore to one or both sides of the recess, but preferably the bearing annulus is located substantially wholly within the recess. Preferably the plastics material of the bearing annulus is selected from acetal resin, solid polyurethane, nylon, polypropylene and polytetrafluoroethylene (PTFE).

The means capable of preventing withdrawal of the ball from the bore may comprise an integral and converging portion (in the direction of withdrawal of the ball) of the bore in which case, at least part of the recess is preferably formed in said portion.

The means capable, in use, of restraining the ball against excessive penetration into the bore may comprise a bearing cap that is adapted to be subjected to a predetermined pressure. The bearing cap may be formed from a plastics material such as acetal resin, solid polyurethane, nylon, polypropylene, or PTFE and preferably frictionally engages the surface of the housing defining the bore, so that the ball joint comprising the housing, the ball, the bearing annulus and the bearing cap may be supplied as a self-contained unit which may be assembled and stored with little fear of it falling apart. The bearing cap may be formed with dimples or projections such as ribs, studs or bosses on its surface which provide the frictional engagement with the bore surface.

The pressure may be applied to the bearing cap by means of a plug which is introduced into the bore from the side thereof remote from the ball and engages a shoulder therein to determine when the correct pressure is applied. The plug may for example comprise one end of a rack bar when the ball joint is to be used in a steering assembly. The said remote side of the bore may be screw-threaded for co-operation with the plug, and preferably means are provided for locking the plug in position in the bore. Such locking means may comprise a screw in the housing that is capable of engaging the plug.

One embodiment of a ball joint in accordance with the present invention will now be described by way of example only, with reference to the accompanying drawing which is an axial sectional view of the ball joint.

In the drawing, a housing 1 is generally cylindrical and is integrally formed of metal. The housing 1 receives in an axial bore 1a, on the left in the drawing, a plug 7 and on the right a ball 4 from which extends a stem 5 forming part of the inner joint assembly of a steering gear. The ball 4 and stem 5 are introduced into the bore 1a from the left-hand end prior to the introduction of the plug 7. The left-hand portion of the bore of the housing 1, which receives the plug, is threaded, as is the outside of the plug 7. The thread of both the plug and housing is relieved at 11.

The right-hand portion of the bore of the housing, which receives the ball, is of smaller diameter than the bore portion which receives the plug so a shoulder 8 is formed where the two portions meet. Starting from this shoulder and proceeding to the right in the drawing, the diameter of the housing bore 1a is uniform for approximately half its length and the diameter of the ball 4 is substantially the same as that of this part-length of the bore 1a. The diameter of the bore then starts to decrease symmetrically, to provide means preventing withdrawal of the ball from the bore 1a, until it reaches a point close to the mouth of the bore, whereupon it diverges rather sharply. An annular recess 2 is provided in the decreasing diameter region of the bore, and in this annular recess is located a bearing annulus 3 of synthetic plastics material having low friction and good wearing characteristics, such as acetal resin. The left-hand surface edge of this bearing annulus 3 is flush with the internal surface of the housing but the right-hand end stands somewhat proud of the internal surface of the housing to prevent contact of the ball with the metal housing.

The ball 4 is further retained within the housing by a bearing cap 6 of synthetic plastics material having low friction and good wearing characteristics, such as solid polyurethane. The cap 6 is held pressed against the ball by the plug 7 which is screwed up to the shoulder 8 and forms one end of a rack bar of a steering gear, and thereby prevents excessive penetration of the ball 4 into the bore 1a. Plug 7 is located in the housing by a grub screw 9 which engages an annular groove 10 in the plug, and it also has a flat bearing cap-engaging surface 7a. As shown in the drawing the cap 6 is slightly tapered to facilitate its insertion into the bore 1a.

In order to maintain a pre-load in the bearing cap 6, the cap is made so that when pushed into place against the ball 4, it will stand proud of the shoulder 8 and extend about 10 to 20 thousandths of an inch above the shoulder. The cap 6 may be provided with a number of dimples (or ribs, bosses, studs or other protruberances) (not shown) on its longitudinal outer surface, whereby the cap is retained by friction within the bore in the housing once the cap has been pressed into place against the ball and before it is engaged by the plug.

The thickness of the cap is calculated in the region of the longitudinal axis of the joint, and it is then calculated how much above the shoulder the cap should be extended to achieve the required pressure when the plug is screwed into place against the shoulder. The thickness will of course vary with a different shape of end surface 7a.

Instead of the cap projecting beyond the shoulder, the plug could be adapted to extend into the smaller diameter part of the bore 1a to exert the required pressure on the cap, when the plug engages the shoulder.

The ball joint described with reference to the drawing thus has the advantage that the ball 4 is of similar diameter to the bore-part in which it is retained, thereby minimising relative stresses in the ball; there is no metal-to-metal contact between the ball 4 and the housing 1; the separate bearing cap 6 and annulus 3 permit different materials to be used; the assembly of the ball 4, the housing 1, the bearing 3 and the cap 6 forms a self-contained unit without the plug 7 which may be assembled and stored with little risk of it falling apart due to the friction fit, provided by the aforementioned dimples, of the cap 6 in the bore 1a; provided there is accurate forming of the cap 6, the correct pre-load may be provided in the cap simply, and the locking of the plug minimises the risk of the pre-load changing; and the joint has few parts, which may be easily assembled.

What we claim is:

1. A ball joint comprising a housing having a bore therein, a ball received in said bore, means capable, in use, of restraining said ball against excessive penetration into sid bore, a portion of said bore of smaller diameter than said ball being capable of restraining the ball against withdrawal from said bore, a bearing annulus of synthetic plastics material having a low coefficient of friction and good wearing characteristics which partly defines said smaller diameter portion of said bore, said bearing annulus having a face generally converging in the direction of withdrawal of said ball and against which said ball bears in its restrained condition, an annular recess in said housing in which said bearing annulus is received in complementary manner, and said ball having substantially the same diameter as the portion of said bore formed in said housing in which said ball is restrained, said means capable, in use, of restraining the ball against excessive penetration into the bore comprising a bearing cap that is adapted to be subjected to a predetermined pressure, said housing defining a shoulder in the bore, and a plug, which is capable of engaging the shoulder from the side of the bore remote from the ball, subjects the bearing cap to said predetermined pressure, said cap standing proud of the shoulder when in engaement with the ball and when not being subjected to said predetermined pressure.

2. A ball joint comprising a housing having a bore therein, a ball received in said bore, means capable, in use, of restraining said ball against excessive penetration into said bore, a portion of said bore of smaller diameter than said ball being capable of restraining the ball against withdrawal from said bore, a bearing annulus of synthetic plastics material having a low coefficient of friction and good wearing characteristics which partly defines said smaller diameter portion of said bore, said bearing annulus having a face generally converging in the direction of withdrawal of said ball and against which said ball bears in its restrained condition, an annular recess in said housing in which said bearing annulus is received in complementary manner, and said ball having substantially the same diameter as the portion of said bore formed in said housing in which said ball is restrained, said means capable, in use, of restraining the ball against excessive penetration into the bore comprising a bearing cap that is adapted to be subjected to a predetermined pressure, said housing defining a shoulder in the bore, and a plug, which is capable of engaging the shoulder from the side of the bore remote from the ball, subjects the bearing cap to said predetermined pressure, the part of said plug that engages the bearing cap projecting beyond the shoulder when the plug is in engagement with the shoulder.

3. A ball joint comprising a housing having a bore formed therein, a ball received in a first portion of said bore, means capable in use of restraining said ball against excessive penetration into said bore, a second portion of said bore of smaller diameter than said first portion of said bore, said second portion of said bore being of smaller diameter than said ball, said second portion being capable of restraining said ball against withdrawal from said bore, a bearing annulus of synthetic plastic material having a low coefficient of friction and good wearing characteristics and at least partially defining said second smaller diameter portion of said bore, said bearing annulus having a radially inner surface a portion of which is curved to generally converge in the direction of withdrawal of said ball and against which said ball bears in its restrained condition, an annular recess in said second portion of said bore in which said bearing annulus is received, said annular recess being defined by axially inner and outer annular end faces lying in planes transverse to the central axis of said bore and a circular bottom surface coaxial with said bore and bounded at opposite ends by said annular end faces, said bearing annulus having a radially outer surface engaging the bottom of said recess and axially spaced sides disposed in abutting engagement with said end faces of said recess, the axially inner side of said bearing annulus having the same length as the axially inner end face of said recess whereby the axially inner surface of said bearing annulus has an axially inner portion of the same diameter as said first portion of said bore in which said ball is received, the axially outer side of said bearing annulus having a length at least as long as the length of said axially outer end face.

4. A ball joint according to claim 3 wherein the bearing annulus is located substantially wholly within the recess.

5. A ball joint according to claim 3 wherein the means capable, in use, of restraining the ball against excessive penetration into the bore comprises a bearing cap that is adapted to be subjected to a predetermined pressure.

6. A ball joint according to claim 5 wherein the bearing cap is formed of a plastics material selected from acetal resin, solid polyurethane, nylon, polypropylene, and PTFE.

7. A ball joint according to claim 5 wherein the bearing cap frictionally engages a surface of the housing defining the bore.

8. A ball joint according to claim 5 wherein the housing defines a shoulder in the bore, and a plug, which is capable of engaging the shoulder from the side of the bore remote from the ball, subjects the bearing cap to said predetermined pressure.

9. A ball joint according to claim 8 wherein said remote side of the bore is screw-threaded for cooperation with the plug.

10. A ball joint as set forth in claim 3 wherein said bearing annulus has a continuous annular form and the radially inner and radially outer surfaces are equidistant from each other.

11. A ball joint as set forth in claim 3 wherein the synthetic plastic material of the bearing annulus is selected from acetal resin, solid polyurethane, nylon, polypropylene, nd PFTE.

* * * * *

UNITED STATES PATENT AND TRADEMARK OFFICE
CERTIFICATE OF CORRECTION

PATENT NO. : 4,203,683

DATED : May 20, 1980

INVENTOR(S) : Peter R. Rogers

It is certified that error appears in the above—identified patent and that said Letters Patent are hereby corrected as shown below:

Column 3, line 25, change "sid" to --said--;

Column 3, line 46, change "engaement" to --engagement--.

Column 4, line 67, change "nd" to --and--.

Signed and Sealed this

Seventh Day of October 1980

[SEAL]

Attest:

Attesting Officer

SIDNEY A. DIAMOND

Commissioner of Patents and Trademarks